United States Patent [19]

Hongo

[11] Patent Number: 4,959,869
[45] Date of Patent: Sep. 25, 1990

[54] METHOD FOR DETERMINING BINARY CODING THRESHOLD VALUE

[75] Inventor: Yasuo Hongo, Kanagawa, Japan

[73] Assignee: Fuji Electric Co., Ltd., Kanagawa, Japan

[21] Appl. No.: 125,813

[22] Filed: Nov. 25, 1987

Related U.S. Application Data

[63] Continuation-in-part of Ser. No. 737,437, May 24, 1985, abandoned.

[30] Foreign Application Priority Data

May 31, 1984 [JP] Japan ................... 59-109665

[51] Int. Cl.$^5$ .............................................. G06K 9/38
[52] U.S. Cl. .................................... 382/51; 382/50
[58] Field of Search ............... 382/14, 18, 33, 34, 382/50-53

[56] References Cited

U.S. PATENT DOCUMENTS

| | | | |
|---|---|---|---|
| 3,665,326 | 5/1972 | Sullivan | 382/51 |
| 3,715,724 | 2/1973 | Demonte | 382/51 |
| 4,064,484 | 12/1977 | Mese | 382/53 |
| 4,430,748 | 2/1984 | Tuhro | 382/50 |
| 4,484,348 | 11/1984 | Shizuno | 382/34 |
| 4,493,106 | 1/1985 | Farhangi | 382/51 |
| 4,535,473 | 8/1985 | Sakata | 382/51 |
| 4,554,593 | 11/1985 | Fox | 382/50 |
| 4,562,486 | 12/1985 | Suzuki | 382/53 |
| 4,567,610 | 1/1986 | McConnell | 382/18 |
| 4,593,325 | 6/1986 | Kannapell | 382/50 |
| 4,601,057 | 7/1986 | Tsuji | 382/51 |
| 4,611,347 | 9/1986 | Netravali | 382/34 |
| 4,656,665 | 4/1987 | Pennebaker | 358/280 |

OTHER PUBLICATIONS

"Boundary Extraction Method and Algorithm", IBM Tech. Disclosure, Chow et al., pp. 1301-1304, Sep. 1971.

Primary Examiner—David K. Moore
Assistant Examiner—Jose L. Couso
Attorney, Agent, or Firm—Finnegan, Henderson, Farabow, Garrett, and Dunner

[57] ABSTRACT

A method for determining a binary coding threshold value for a target object comprises determining reference binarization characteristic values for each reference object, storing the reference values in a memory, selecting the reference value associated with a reference object corresponding to the target object, generating in a learning procedure a histogram corresponding to the selected reference value, extracting feature data, i.e., binarization characteristic values, in a threshold control step from the histogram, and setting the binary coding threshold value to a predetermined weight mean value calculated from the binarization characteristics.

4 Claims, 5 Drawing Sheets

METHOD FOR DETERMINING BINARY CODING THRESHOLD VALUE7257

This is a Continuation-In-Part of Ser. No. 737,437, filed May 24, 1985, now abandoned.

FIELD OF THE INVENTION

This invention relates to a method of determining a threshold of binarization when a binary-coded picture is formed by digitizing a video signal provided when a television camera or the like photographs an object.

More specifically, the invention relates to a method of determining a threshold of binarization which comprises a learning procedure for determining a binary coding threshold value for a reference picture, and a threshold control procedure operated in time series mode for determining a suitable binary coding threshold value whenever the reference picture appears.

BACKGROUND OF THE INVENTION

Two binarization methods are known in the art. One is a fixed-type binary coding system in which the threshold value is fixed, and the other is a floating type binary coding system in which the threshold value may be varied. The former system suffers from a difficulty that when the video signal is changed by optical disturbance or variation of the reflection factor of an object, the strokes of the resultant binary-coded picture become bolder or finer i.e., the video representation is unstable.

The latter system encounters no trouble when the video signal changes as a whole, because the threshold value is changed in response to the variation of the video signal. However, in the case when the object's contrast changes depending on the positions of scanning lines, it is impossible to obtain a suitable picture merely by regularly varying the threshold value when the video signal changes as described above.

This will be described in more detail.

FIG. 1 is a plan view showing one example of a keyboard. Each of a group of key tops $1a$ on the left side of FIG. 1 has a black character (digit) against a light background, and each of a group of keytops $1b$ on the right side of FIG. 1 has a white character (arrow mark) against a dark background.

The key tops on the left side of FIG. 1 are different in contrast from those on the right side. Therefore, it can be readily understood that it is impossible to obtain an excellent binary-coded picture thereof according to a simple floating type binary coding system.

OBJECTS AND SUMMARY OF THE INVENTION

An object of the present invention is a binary coding threshold value determining method for forming high quality binary-coded pictures.

Another object of the present invention is a binary coding threshold value determining method capable of adjusting to binary images of objects with different contrasts and variations in surfaces.

A further object of the present invention is a binary coding threshold value determining method that is not affected by optical disturbances and variations in the reflection factor of scanned objects.

These and other objects are accomplished by a method for determining a binary coding threshold value to be used in processing video signals of a target object comprising the steps of determining a binary threshold of binarization for each of a plurality of reference objects, storing the reference threshold of binarization in a memory, selecting from the memory device the stored reference coding threshold values for a reference object corresponding to the target object, and generating from the selected reference binary coding threshold values the binary coding threshold value for use in processing the video signals of the target object.

BRIEF DESCRIPTION OF THE DRAWINGS

The manner by which the above and other objects, features, and advantages of the present invention are attained will be more apparent from the following detailed description when considered in view of the drawings, wherein:

FIG. 5($b$) is a typical histogram formed from feature data that is extracted from video signals of the object of FIG. 5($a$), for example, the object is a keytop and the pattern is a line drawing;

FIG. 6($b$) is a typical histogram formed from feature data that is extracted from video signals of the object of FIG. 6($a$);

DETAILED DESCRIPTION

Figure 3:
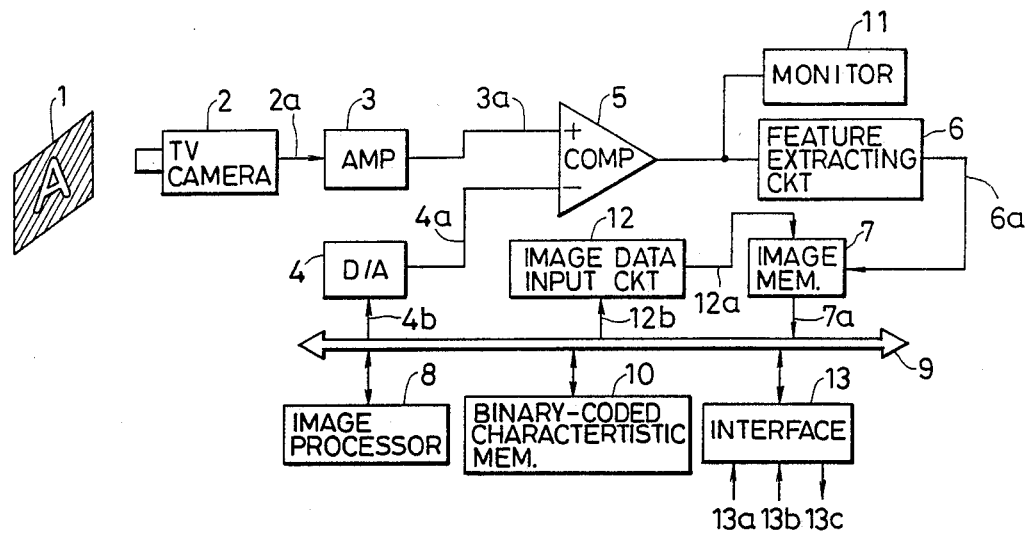
FIG. 3 is a block diagram of an apparatus for practicing the method of determining binary coding threshold values according to the present invention and being used for threshold control.

FIG. 3 is a block diagram showing the arrangement of an apparatus for practicing a method of determining a binary coding threshold value according to the present invention. This apparatus is used for both learning and threshold control procedures. In FIG. 3, an object 1 is scanned by a TV camera 2. For example, the objects may be keytops on a keyboard. The resultant video signals are processed by an apparatus including an amplifier circuit 3, a D/A (digital-to-analog) converter 4, a comparator 5, a feature extracting circuit 6, an image memory 7, an image procesor system 8, a bus 9, a binary-coded characteristic memory 10, a monitor TV set 11, an image data input circuit 12, and an external interface circuit 13.

The above-described apparatus operates as follows. The TV camera 2 forms a video signal comprising a series of images of the object 1, and its video signal 2a is amplified by the amplifier circuit 3. The D/A converter 4 outputs analog data, namely, a variable binary coding threshold value 4a according to the binary coded threshold value 4b (a digital data) which is specified through the bus 9 by the image processor 8. In the comparator 5, an amplified video signal 3a outputted by the amplifier circuit 3 is compared with the binary coding threshold value 4a. As a result, a binary-coded signal 5a is applied to the monitor TV set 11 and the feature extracting circuit 6.

The feature extracting circuit 6 extracts image feature data 6a and writes it in the image memory 7 in a DMA (direct memory access) mode.

The writing operation is carried out when the image data inputting circuit 12 provides an instruction 12a to the image memory 7 in response to an image inputting instruction 12b from the image processor 8. The image processor 8 detects through the external interface circuit 13 that the object 1 is in the field of vision of the TV camera 2, and learns the binary-coded characteristics of the object. The binary-coded characteristics and the number (Nk) 13a associated with the objects are stored in the binary-coded characteristic memory 10. The memory 10 stores the characteristic values of each object ($N_k K=1,2 \ldots N_{TK}$), where $N_{TK}$ is the total number of objects. The operator can observe the binary-coded image 5a on the monitor TV set 11.

Whenever a binary coding instruction is applied to the image processor 8 through the interface circuit 13 according to the learned binary-coded characteristics, the image processor 8 calculates the optimum threshold value (4b) and outputs the binary coding threshold value 4b which follows the condition of an object and any disturbance around it.

Figure 4:
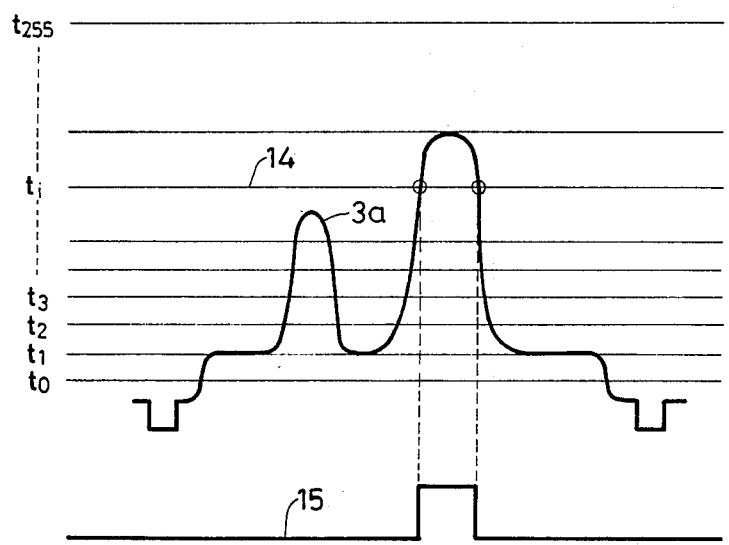
FIG. 4 is an explanatory diagram of a video signal and a corresponding binary-coded signal.

FIG. 4 shows a video signal and a corresponding binary-coded signal thereof.

An amplified video signal 3a (in the interval of one horizontal scanning line) is converted into a binary-coded signal 15 according to a binary coding threshold value $t_i$ (i=0 to 255). In this case, 256 different binary coding threshold values are available, and the image processor can select a desired one of the 256 threshold values.

Figure 5A:
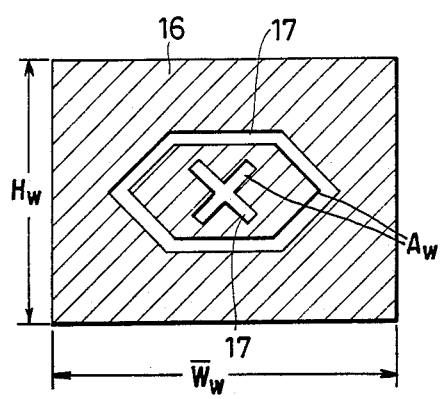
FIG. 5($a$) is an illustration of a white object in the window to be identified and the size of the window is $W \times H$ pixels (W: width, H: height)
Figure 5B:
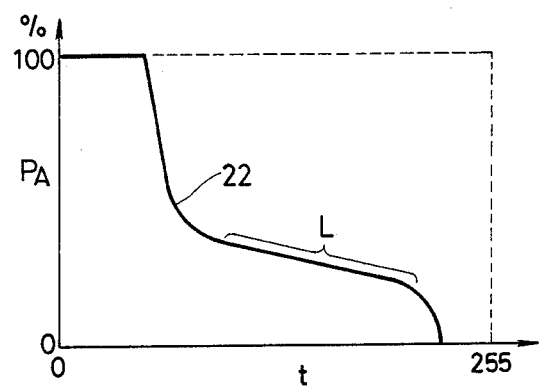

A learning method of the binarization characteristics of bright objects will be described with reference to FIGS. 5(a) and 5(b). FIG. 5(a) is an explanatory diagram showing a bright object 17 in a dark background 16. The object is assumed to be a line drawing. FIG. 5(b) shows a histogram indicating the area (A) of the binary-coded image of the bright object 1 in FIG. 5(a) in area percents ($P_A$) under the condition that an area has a value of 100% when the binary coding threshold value is zero (0), the area percent $P_A$ is defined as $$P_A = \frac{100 \times A}{W \times H} \%$$

That is, the 256 binary coding threshold values t are plotted on the horizontal axis, while the area percents $P_A$ are plotted on the vertical axis. As the threshold value is increased, the corresponding area of the binary-coded image of the bright object 17 is determined to decrease causing the typical histogram curve 22 as shown in FIG. 5(b). According to the histogram 22, it can be determined whether the object is a bright object or a dark object (which is in a bright background). This will be described later.

Figure 6A:
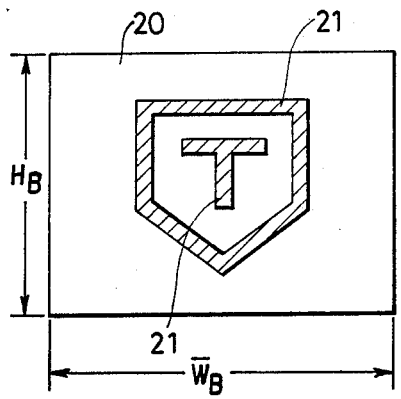
FIG. 6($a$) is an illustration of a black object to be identified.
Figure 6B:
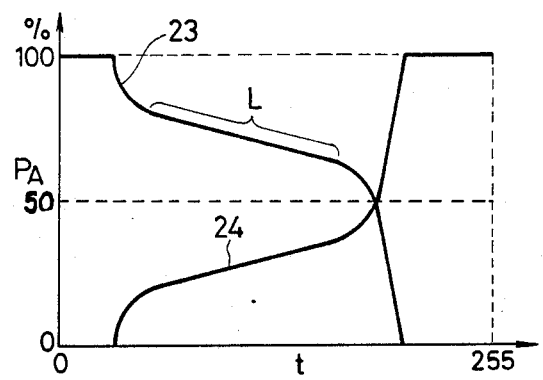

FIG. 6(a) is an explanatory diagram showing dark object 21 in a bright background 20. FIG. 6(b) shows a histogram 23 ($P_A$) for the object 21. An additional histogram 24 is obtained by calculating $(100 - P_A)\%$. That is, in the histogram 24, 0% is given to the area of the binary-coded image when the binary coding threshold value is set to zero (0). Thus, the histogram 23 may be called "a forward histogram" and the histogram 24 may be called "a reverse histogram."

As is apparent from the histogram 22 and the histogram 23, in the case of a bright object, the inclined part L, that can be approximated with a straight line, is relatively low in position compared to the 50% line, while in the case of a dark object, the inclined part is relatively high in position compared to the 50% line. Accordingly, it can be determined from the histograms whether the reference object being examined is a bright one or a dark one. When the target object includes a bright part and a dark part, two windows each of which is projected over the bright or dark part are used and the data in each window are incrementally processed. In other words, if in a given histogram the inclined part L which is relatively low in position is much longer than that which is relatively high in position, then the aimed object is a bright one. If the former is much shorter than the latter, then the object is a dark one.

Figure 7:
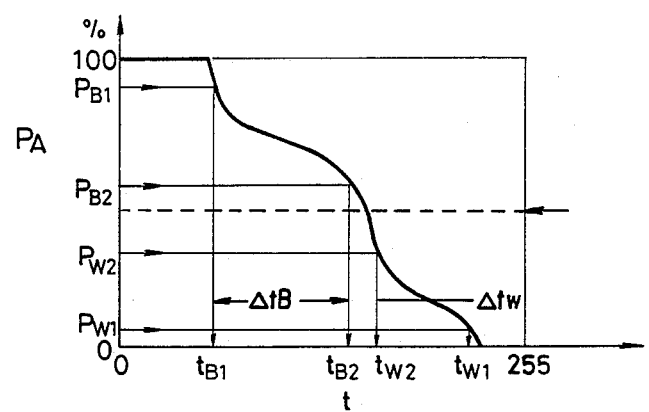
FIG. 7 is a graphical illustration of a general histogram.

According to the present invention, the binary-coded characteristic is learned under the condition that it is unknown whether the reference object to be binary-coded is bright or dark. In this case, in general, a histogram as shown in FIG. 7 is obtained. It is determined from this histogram whether a reference object is bright or dark according to the following procedure: By way of example, an object under determination is a figure formed with lines, in this case.

Area percent parameters $P_{W1}$, $P_{W2}$, $P_{B1}$ and $P_{B2}$ for making bright and dark determinations are required to meet the following conditions:

$$0 < P_{W1} < P_{W2} \leq 50 \leq P_{B2} < P_{B1} < 100 (\%) \quad (1)$$

For instance, $P_{W1}=0.5\%$, $P_{W2}=40\%$, $P_{B1}=99.5\%$, and $P_{B2}=60\%$ are tentatively selected. The values of parameters ($P_{W1}$, $P_{W2}$) are determined from the lower and upper limits of area percent about the target bright objects (line drawings). The area percent of a line drawing is set about 0.1 to 20%. The value of parameters ($P_{B1}$, $P_{B2}$) are determined from the upper and lower limits about the dark object. Presumably $P_{W1} \neq 100 - P_{B1}$, $P_{W2} \neq 100 - P_{B2}$.

Four binary coding threshold values $t_{W1}$, $t_{W2}$, $t_{B1}$ and $t_{B2}$ for providing the area percents $P_{W1}$, $P_{W2}$, $P_{B1}$ and $P_{B2}$ are determined from the histogram (the suffix characters "W" means "white" and "B" means "black").

From these, the following values are obtained:

$$\Delta t_W = t_{W1} - t_{W2} \quad (2)$$

$$\Delta t_B = t_{B2} - t_{B1} \quad (3)$$

Both values ($\Delta t_W$, $\Delta t_B$) mean the contrasts of the original picture. According to the threshold value widths $\Delta t_W$ and $\Delta t_B$, it is determined whether the reference object is bright or dark.

That is, when $\Delta t_W \Delta t_B$, the reference object is bright, and when $\Delta t_B \Delta t_W$, the reference object is dark, under this condition the binary-coded characteristic is determined as described later. According to the above-described method, it can be determined from the histogram 22 in FIG. 5(b) that the reference object is bright, and it can be determined from the histogram 23 in FIG. 6(b) that the reference object is dark.

In the case where the reference object is bright, the most suitable threshold value $t_0$ is obtained according to the following equation (4):

$$t_0 = \frac{n_W \cdot t_{W2} + m_W \cdot t_{W1}}{m_W + n_W} \tag{4}$$

In general, the optimum value of $t_0$ is the midpoint between $t_{W1}$ and $t_{W2}$. This corresponds to the point obtained by internally dividing the above-described two binary coding values $t_{W2}$ and $t_{W1}$ with the ratio of $m_W{:}n_W$. For example, it is assumed that $m_W{:}n_W = 4{:}3$ (these data can be experimentally selected).

In the case where the reference object is dark, the most suitable threshold value $t_0$ is obtained according to the following equation (5):

$$t_0 = \frac{n_B \cdot t_{B1} + m_B \cdot t_{B2}}{m_B + n_B} \tag{5}$$

In general, the best value of $t_0$ is the midpoint between $t_{B1}$ and $t_{B2}$. This corresponds to the point which is obtained by internally dividing the two binary coding threshold values $t_{B1}$ and $t_{B2}$ with the ratio of $m_B{:}n_B$. For example, $m_B{:}n_B$ can be $3{:}4$.

A method of obtaining a binary-coded characteristic in the case where the reference object is bright will be described with reference to FIG. 8.

Figure 8:
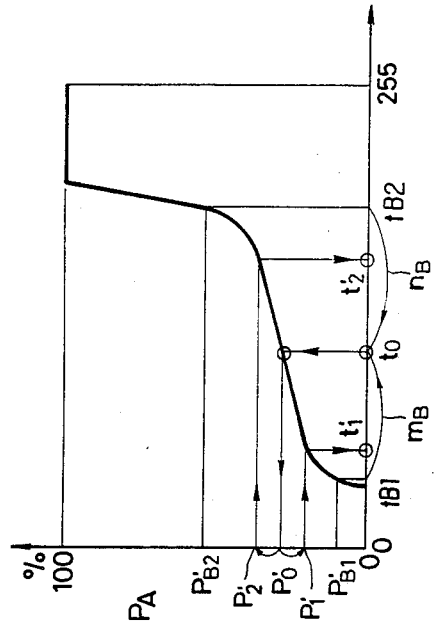
FIG. 8 is an explanatory diagram for a description of how bright objects are processed by the method of the present invention.

FIG. 8 is an explanatory diagram showing a histogram for a bright object. An area percent $P_0$ for the most suitable threshold value $t_0$ is obtained from the histogram in FIG. 8.

Next, data $P_1$ and $P_2$ are obtained from the following expressions (6) and (7):

$$P_1 = \alpha_1 \cdot P_0 \text{ (where } \alpha_1 = 1.1 \text{ to } 1.9) \tag{6}$$

$$P_2 = \alpha_2 \cdot P_0 \text{ (where } \alpha_2 = 0.1 \text{ to } 0.9) \tag{7}$$

Binary coding threshold values $t_1$ and $t_2$ for these data $P_1$ and $P_2$ are obtained from the histogram.

Here $\alpha_1$ and $\alpha_2$ mean the variation of area percent for a bright object. The variation of area is usually in the range of between about $+10$ and $20\%$, and then the values $\alpha_1$ and $\alpha_2$ are selected as $\alpha_1 = 1.2$, $\alpha_2 = 0.8$. In general, the relationship between $\alpha_1$ and $\alpha_2$ is as follows: $\alpha_1 - 1 = 1 - \alpha_2$.

Figure 9:
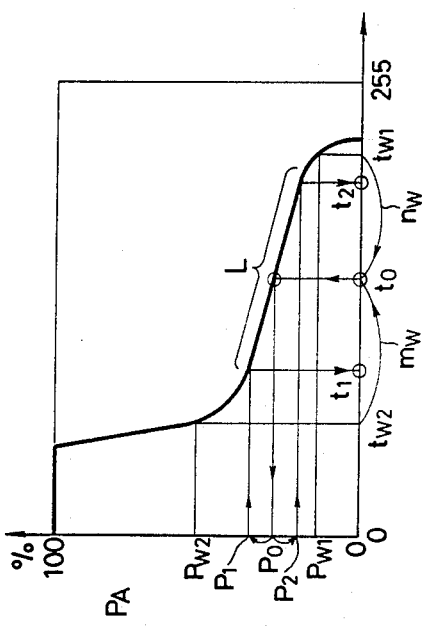
FIG. 9 is an explanatory diagram for a description of how dark objects are processed by the method of the present invention.

Similarly, in the case where the reference object is dark, an area percent $P_0$ for the most suitable threshold value $t_0$ is obtained with reference to FIG. 9, and with respect to the area percent $P_0$ thus obtained data $P_1'$ and $P_2'$ are obtained according to the following expressions (8) and (9). In the case of a dark object, a reverse histogram is used as is apparent from FIG. 9.

$$P_1' = \beta_1 \cdot P_0' \text{ (where } \beta_1 = 0.1 \text{ to } 0.9) \tag{8}$$

$$P_2' = \beta_2 \cdot P_0' \text{ (where } \beta_2 = 1.1 \text{ to } 1.9) \tag{9}$$

The variation of area of a dark object is the same as that of a bright object, so that the values $\beta_1$ and $\beta_2$ are selected as 0.8 and 1.2, respectively. The relationship between $\beta_1$ and $\beta_2$ is as follows: $1 - \beta_1 = \beta_2 - 1$.

Binary coding threshold values $t_1'$ and $t_2'$ for these data $P_1'$ and $P_2'$ are obtained from the histograms.

Next, the binary coding threshold value $t$ of an optional point (the corresponding area percent being P) on the inclined part which can be approximated with a straight line is represented by the following expression (10) using the constants obtained as described above:

$$t = t_0 + \gamma_0(P - P_0) \tag{10}$$

where in the case of a bright object $$\gamma_0 = \frac{t_1 - t_2}{P_1 - P_2}, \text{ where } \gamma_0 < 0 \text{ and}$$

in the case of a dark object $$\gamma_0 = \frac{t_1' - t_2'}{P_1' - P_2'}, \text{ where } \gamma_0 > 0$$

The data $\gamma_0$ indicates the gradient of the inclined part L.

For each of the concerned objects, the most suitable threshold value $t_0$, the corresponding area percent $P_0$, and the gradient $\gamma_0$ are obtained as binary-coded characteristic constants and are stored in the memory 7.

Figure 10:
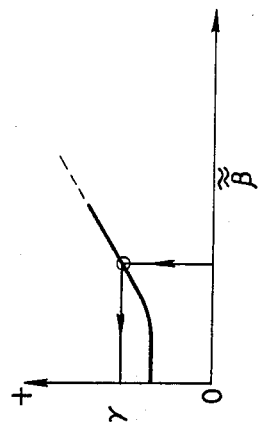
FIG. 10 is a graphical illustration of the relationships among binary-coded characteristic variables $\gamma$ and $\tilde{\alpha}$.
Figure 11:
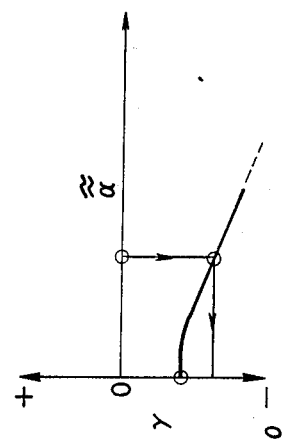
FIG. 11 is a graphical illustration of the relationships among binary-coded characteristic variables $\gamma$, and $\tilde{\beta}$.

The gradient $\gamma_0$ can be set to the most suitable value as follows. The most suitable value is determined by the utilization of the fact that the data $\widetilde{\alpha}(\widetilde{\beta})$ concerning the determination of the above-described binary coding threshold values $t_1$ and $t_2$ ($t_1'$ and $t_2'$) and the gradient $\gamma$ ($\gamma$ being used instead of $\gamma_0$ because it is a variable) depend on each other as indicated in FIG. 10 (FIG. 11) where $\widetilde{\alpha}$ and $\widetilde{\beta}$ are as follows:

$$\widetilde{\alpha} = \frac{(\alpha_1 - 1) + (1 - \alpha_2)}{2},$$

$$\widetilde{\beta} = \frac{(1 - \beta) - (\beta_2 - 1)}{2}$$

That is, $\widetilde{\alpha}$ is set to 0.1, 0.2, 0.3 and so forth, and the corresponding gradients $\gamma_1, \gamma_2, \gamma_3 \ldots \gamma_{n-1'}$, and $\gamma_n$ are obtained. When $|\gamma_n - \gamma_{n-1}| < \Delta$ is established, the value $\gamma_{n-1}$ is employed as the binary-coded characteristic value $\gamma_0$. It should be noted that the value $\Delta\gamma$ can be determined from FIG. 10.

Thus, the binary-coded characteristic data ($t_0$, $P_0$ and $\gamma_0$) of each of the concerned objects can be obtained, and these data together with its object number can be stored in the memory 7.

Figure 1:
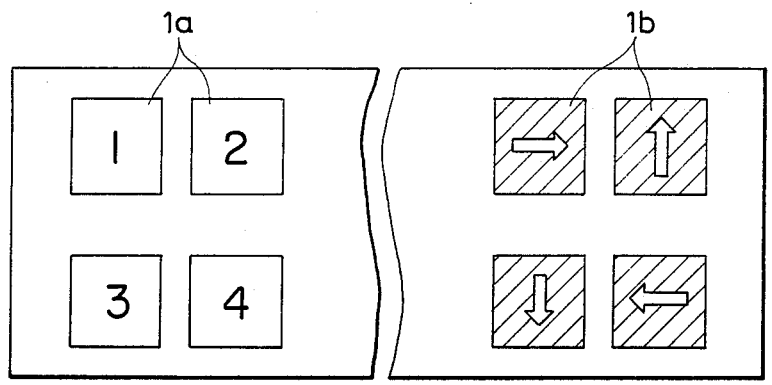
FIG. 1 is a plan view of a portion of a conventional keyboard.
Figure 2:
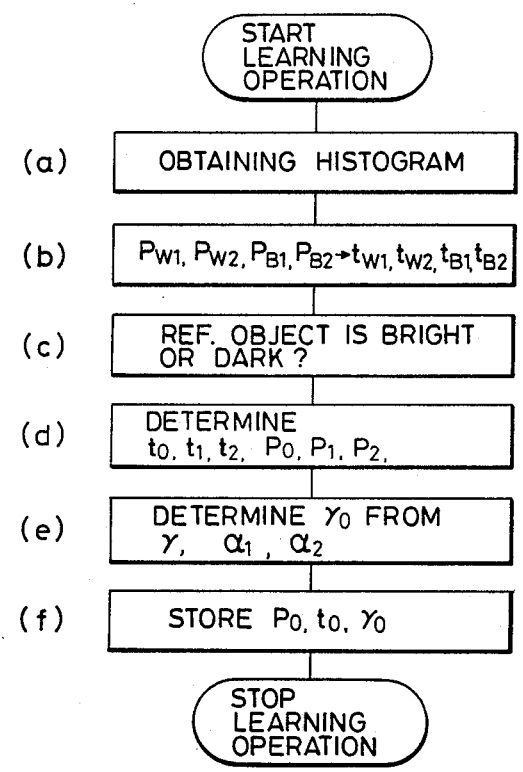
FIG. 2 is a flow chart illustration of the steps of a learning operation performed in accordance with the method of the present invention.

The learning operation is as described above, and FIG. 2 is a flow chart for the learning operation.

Now, a control method of setting threshold values which is for the judgment of an object will be described. The principle of threshold control is that the area of each object becomes constant in each judgment.

It is assumed that the binary-coded characteristics of an object whose object number is N are represented by $P_0N$, $t_0N$ and $\gamma_0N$. Instead of the area percent $P_0N$, an actual area value $A_0N$ may be employed. However, in this case, $\gamma_0$ is obtained according to the following equation:

$$\gamma_0 = \frac{t_1 - t_2}{a_1 - a_2} \text{ or } \frac{t_{1'} - t_{2'}}{a_{1'} - a_{2'}}$$

where $a_1$ and $a_2$ ($a_{1'}$ and $a_{2'}$) are the area values corresponding to the above-described data $P_1$ and $P_2$ ($P_{1'}$ and $P_{2'}$).

$$A_1 = \frac{P_1}{100} \times W \times H, A_2 = \frac{P_2}{100} \times W \times H.$$

This method will be described by using area values.

Where an area $A_n^N$ is obtained with respect to a reference object that appears at the n-th time and has an object number N, a binary coding threshold value $t_n^N$ to be used for the next time is obtained according to the following expression (11):

$$t_n^N = t_{n-1}^N - \gamma_0^N(\overline{A}_n^N - A_0^N)$$

where $\overline{A_n^N} = \frac{l \cdot \overline{A_n - 1}^N + m \cdot A_n^N}{l + m}$ where $A_N$ is the percent area.

The data l and m are, for example, integers which are 10 to 1 in this case, where l (is the weight constant of the last data ($A_{N-1}, A_{N-2}, \ldots$), m is the weight constant of the present data $A_N$. The data $\overline{A}_n N$ will be called "a composite area." The composite area is the mean value of the last and the present areas weighted by the constants (l,m). As is apparent from the above expression, the composite area is a weighted means value, which may be referred to as "a dynamic mean value" including area values that have been obtained previously. That is, the binary coding threshold value to be used for the next time is obtained by shifting the preceding binary coding threshold value along the inclined part L in FIG. 8 as much as the data that is determined from the composite area. The data $\overline{A}_n N$ and the characteristics ($A_0^N$, $t_0^N$ and $\gamma_0^N$) are stored in memory each time, to control a threshold value for the next time.

Figure 12:
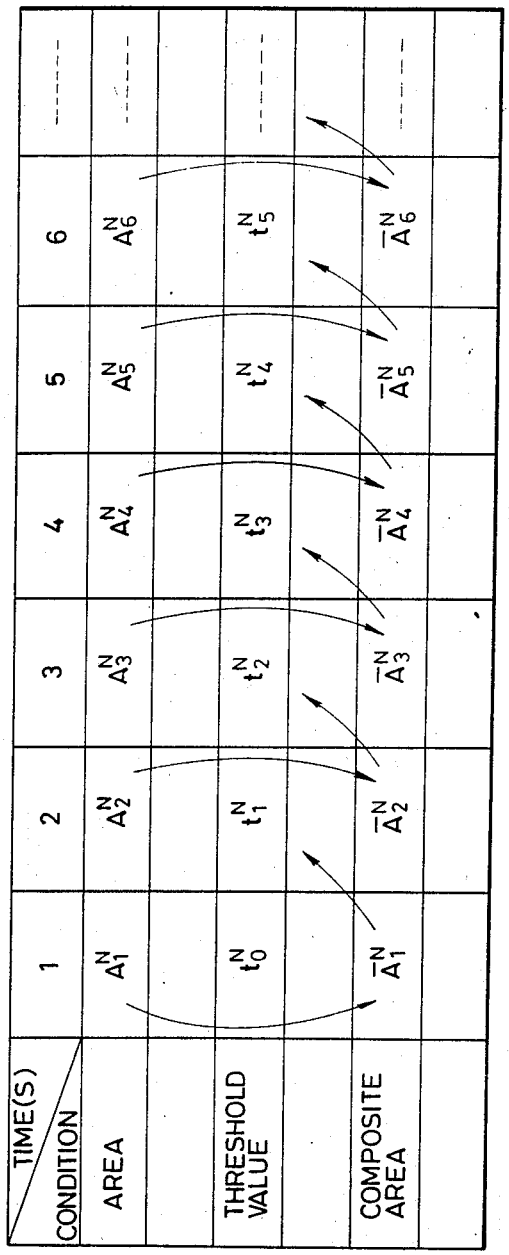
FIG. 12 is an explanatory diagram for a description of a practical threshold control procedure for determining binary coding threshold values.

FIG. 12 is an explanatory diagram showing the above described procedure for determining binary coding threshold values. It can be understood from FIG. 12 that, in the procedure, a composite area is calculated from the area obtained each time, and a binary coding threshold value for the next time is determined according to the composite area thus calculated.

According to the present invention, the image processor 8 can select any one of the 256 binary coding threshold values, as the value $t^N$, and the feature data (especially the area value) of the binary-coded picture are extracted and stored in the image memory 7. Therefore, for each object, the area histogram (or area percent histogram) can be readily measured, and the image processor can calculate the three characteristic data $T_0$, $A_0$ (or $P_0$) and $\gamma_0$ as binary-coded characteristic constants.

These binary-coded characteristic constants are measured for each object during the learning operation, and according to the binary coding instruction applied externally, the binary-coded characteristic constants and the composite area $\overline{A}_n$ (or composite area percent $\overline{P}_n$) are stored for each object and each step. Furthermore, the video level variation due to optical disturbance, etc., is measured, so that a variation for the next time is estimated from the last composite area to determine a binary coding threshold value for the next time. This threshold control aims to preserve the area of each object.

Thus, the binary coding threshold value can be determined which follows the variation with time of the video level due to optical disturbance, temperature variation, and the reflection characteristic of an object, as a result of which binary-coded images can be obtained.

What is claimed is:

1. A method for determining a set of binarization characteristic values representing area $A_0$, threshold $t_0$, and gradient $\gamma_0$ to be used for threshold control in processing video signals of a target object comprising the steps of:
    generating a histogram for each of a plurality of reference objects representing an area of each of the objects in area percents for different values of a binary coding threshold value;
    determining whether each of the plurality of reference objects is a bright object or a dark object in accordance with the histogram for that object;
    determining a plurality of sets of reference binary coding threshold values, corresponding areas, and gradients, each of said sets corresponding to a different one of a plurality of reference objects, in accordance with the results of the bright/dark determining step;
    storing said sets of reference binary coding threshold values in a memory device;
    selecting from the memory device the stored set of reference binarization characteristic values for a reference object corresponding to the target object; and
    generating from said selected reference set of binarization characteristic values the binary coding threshold value for use in processing the video signals of the target object to inspect the target object.

2. The method according to claim 1, wherein the step of determining the sets of reference binary coding threshold values comprises the steps of:
    forming a reference area percent histogram associated with each of the reference objects by extracting feature data from video signals of the reference objects, said feature data including the area percents of the reference objects having a selected brightness characteristic at selected signal threshold levels; and
    deriving binary-coded characteristic parameters ($A_0$, $t_0$, $\gamma_0$) including a most suitable threshold value from each of said histograms.

3. A method according to claim 2, wherein said step of storing includes storing in the memory each of said histograms and said derived binary-coded characteristic values and threshold value derived therefrom at a processing time for threshold control.

4. A method according to claim 3, wherein said step of generating the binary coding threshold to control the binarization threshold comprises the steps of:
    calculating a weighted mean value as a dynamic mean value for said feature data extracted from said video signals of the reference object corresponding to the target object; and
    setting the threshold of the set of binarization characteristic values for the target object to said calculated predetermined weighted mean value.

* * * * *